(12) United States Patent
Briggs

(10) Patent No.: US 6,206,386 B1
(45) Date of Patent: Mar. 27, 2001

(54) SNOWMOBILE DOLLY

(76) Inventor: Thomas V. Briggs, 1368 Rainer Blvd., Canton, MI (US) 48187

( * ) Notice: Subject to any disclaimer, the term of this patent is extended or adjusted under 35 U.S.C. 154(b) by 0 days.

(21) Appl. No.: 09/253,363

(22) Filed: Feb. 22, 1999

(51) Int. Cl.⁷ .................................................. B62B 1/00
(52) U.S. Cl. ........................ 280/79.11; 280/79.2; 414/447
(58) Field of Search .............................. 280/79.1, 79.11, 280/47.331, 8, 79.2, 767; 180/182, 5, 183, 184; 414/447

(56) References Cited

U.S. PATENT DOCUMENTS

| | | | |
|---|---|---|---|
| D. 310,904 | * 9/1990 | Dinges | D34/12 |
| 3,647,237 | * 3/1972 | Milton | 280/47.24 |
| 3,700,212 | * 10/1972 | Morgenberger | 254/131 |
| 3,777,829 | 12/1973 | Rogers | 180/5 |
| 3,860,078 | * 1/1975 | Stoick | 280/79.1 |
| 3,897,959 | * 8/1975 | Haffner | 280/79.1 |
| 4,288,087 | 9/1981 | Morrison | 280/47.32 |
| 5,269,501 | * 12/1993 | Liegel et al. | 269/17 |
| 5,441,378 | * 8/1995 | Puls | 414/458 |
| 5,449,184 | * 9/1995 | Knobloch | 280/79.11 |
| 5,599,031 | * 2/1997 | Hodges | 280/79.11 |
| 5,632,498 | 5/1997 | Beaudet et al. | 280/79.11 |
| 5,716,061 | * 2/1998 | Sloan et al. | 280/43.23 |
| 6,015,254 | * 1/2000 | Keeler | 414/447 |

* cited by examiner

*Primary Examiner*—J. J. Swann
*Assistant Examiner*—James S. McClellan
(74) *Attorney, Agent, or Firm*—Charles W. Chandler

(57) ABSTRACT

A snowmobile support dolly has a frame with forward swivel casters and rear swivel casters. The frame includes a pair of channels for supporting the snowmobile skis, and a rear post for supporting the snowmobile track above the frame.

4 Claims, 2 Drawing Sheets

SNOWMOBILE DOLLY

BACKGROUND OF THE INVENTION

This invention is related to a dolly useful for storing a snowmobile, and more particularly to a snowmobile dolly for supporting the track of the snowmobile in a raised position.

Snowmobile dollies are used for storing snowmobiles when they are not in use. Some prior art snowmobile dollies have been disclosed in U.S. Pat. No. 5,632,498 issued May 27, 1997, to Ernie Beaudet and Mark A. Lamberty for "Snowmobile Dolly System"; U.S. Pat. No. 4,288,087 issued Sep. 8, 1981 to Robert I. Morrison for "Simplified Snowmobile Support Dolly"; and U.S. Pat. No. 3,777,829 issued Dec. 11, 1973 to Arthur L. Rogers for "Snowmobile Wheel Support Combination".

Typically, such prior art dollies support the skis on a wheeled support. The rear track is supported either on a separate wheeled support or on the ground. It is desirable to store a snowmobile in a position such that the weight of the snowmobile does not rest on the track, while still providing means for easily maneuvering the snowmobile into a compact storage location, such as in a garage or the like.

SUMMARY OF THE INVENTION

The broad purpose of the present invention is to provide an improved snowmobile dolly comprising a frame having forward caster supporting the skis and a rear post supporting the track in a suspended position. The post is removable so that the rear end of the dolly frame can be inserted under the snowmobile, between the skis to a position behind the snowmobile's rear bumper. The snowmobile is raised and the bumper connected to the upper end of the post.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
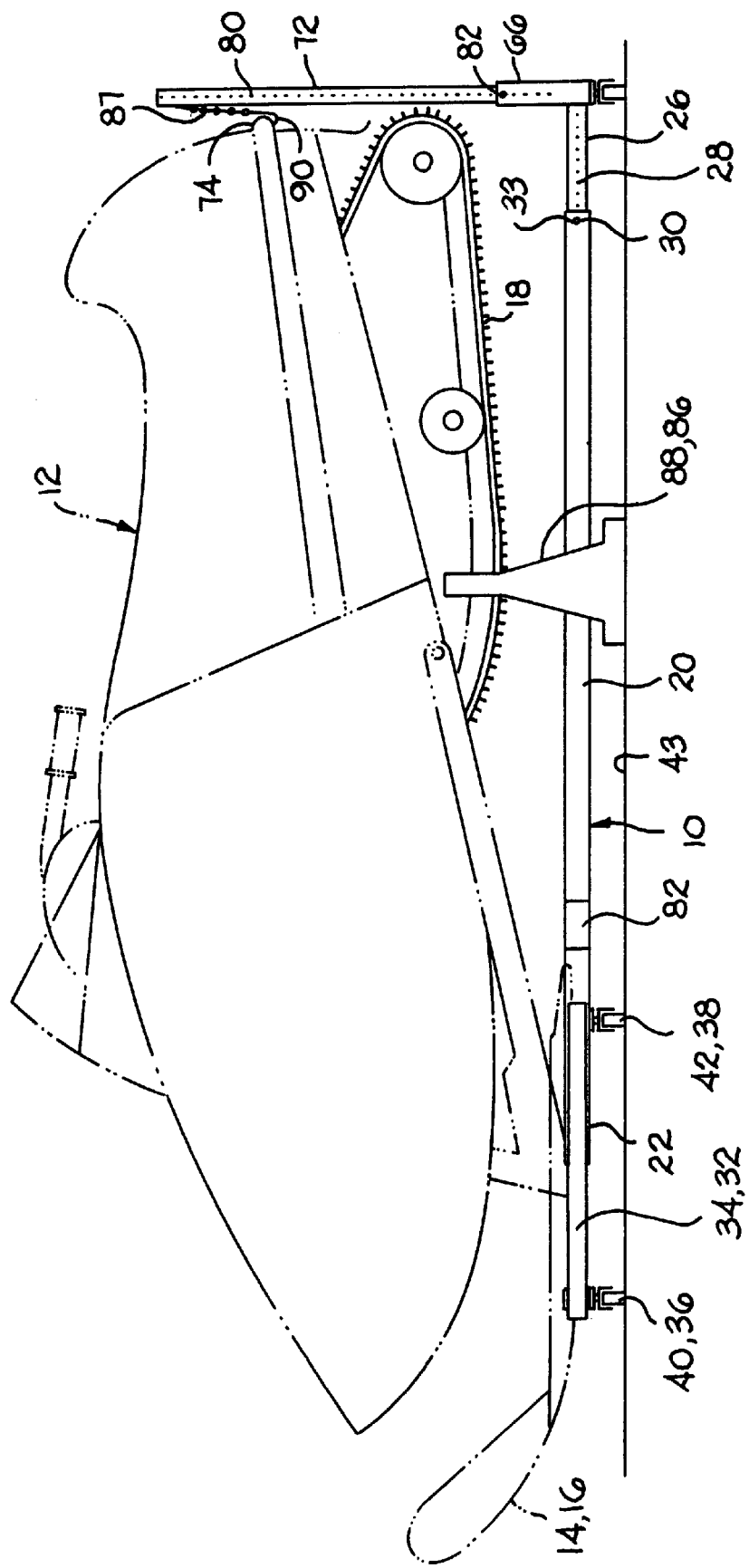
FIG. 1 is an elevational view of a snowmobile mounted on a dolly illustrating the preferred embodiment of the invention.

Referring to the drawings, FIG. 1 illustrates a preferred dolly 10 for supporting a conventional snowmobile 12 having a pair of forward, laterally spaced, parallel skis 14 and 16, and a rear driving track 18. The snowmobile is a conventional vehicle and is representative of a variety of commercially available vehicles.

Figure 2:
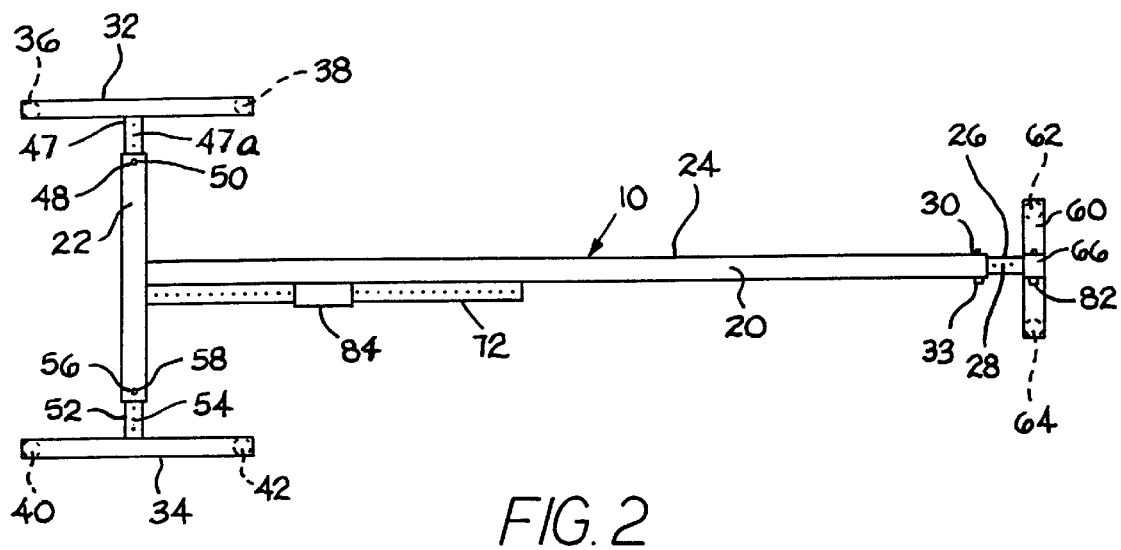
FIG. 2 is a plan view of the dolly.
Figure 3:
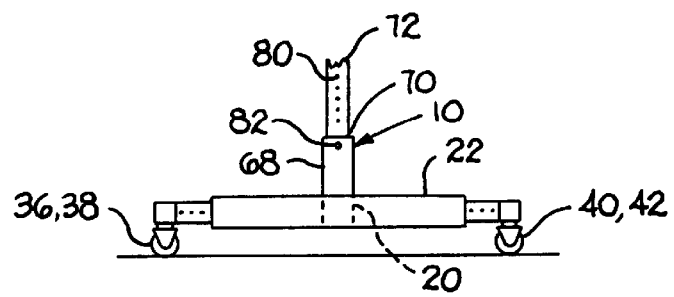
FIG. 3 is a front elevational view of the dolly.

Referring to FIGS. 1 and 2, frame 10 comprises an elongated body 20 welded to a steel tubular cross member 22 in a T-shaped configuration. Body 20 comprises two square steel tubular body sections 24 and 26. The forward end of rear body section 26 is telescopically received in body section 24. Body section 26 has a plurality of longitudinally spaced opening means 28 which are aligned with a pair of aligned openings 30 in the rear end of body section 24 such that the overall length of the body can be adjusted by inserting a pin 33 into a selected pair of openings 28.

Figure 4:
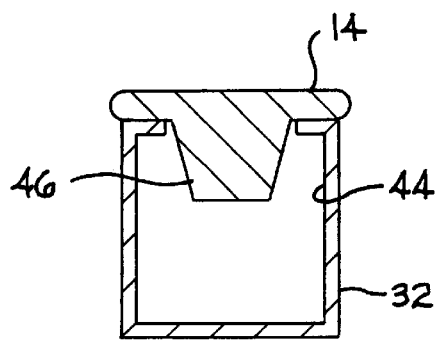
FIG. 4 is an enlarged cross sectional view through a typical ski-supporting channel.

Referring to the forward end of the dolly, a pair of elongated channel-shaped supports 32 and 34 are supported on swivelly mounted casters 36, 38, 40 and 42, respectively. The casters can roll on ground-surface 43. As can be seen in FIG. 4, support 32 is representative of supports 32 and 34 and has a channel-shaped configuration 44 for receiving the conventional bottom rib 46 of snowmobile ski 14.

A square steel tubular support member 47 has a series of longitudinally aligned perforation means 47a welded at right angles to the mid-section of support 32. Tubular support member 47 is telescopically received in one end of cross member 22 and adjusted to align a selected pair of perforations 47a with openings 48 in cross member 22. Pin 50 is inserted in the aligned openings to adjust the distance of support 32 from body section 24 to accommodate the location of the right hand ski on the snowmobile.

Similarly, a square steel tubular support member 52 has one end welded at right angles to the mid-section of support 34. Support member 52 has a series of longitudinally spaced perforations 54, which are aligned with a pair of aligned openings 56 in cross member 22. The two telescopically engaged support members are locked in position by a pin 58. Thus, the distance between the two parallel supports 32 and 34 may be adjusted to accommodate the distance between the skis of the snowmobile.

Rear body section 26 is welded to a square tubular support member 60 at the rear end of the body. Support member 60 is parallel to cross-member 22. Swivel casters 62 and 64 are attached to the ends of support member 60.

Cross-member 22, body 20 and rear support member 60 are disposed in a common plane.

A tubular steel elongated vertical support 66 has a lower end welded to the midsection of and perpendicular to support member 60 adjacent the rear end of body section 26. Vertical support 66 has longitudinally spaced perforation means 68, and a top post-receiving opening 70.

The upper end of vertical support 66 is lower than the bottom surface of the snowmobile body so that the dolly's rear end can be inserted beneath the forward end of the snowmobile body, between the skis to position support 66 rearward of and beneath snowmobile bumper 74.

A post 72 has a lower end telescopically received in the post-receiving opening of support 66. Post 72 has a length such that when it is received in support 66, the upper end of the post extends above bumper 74.

The post has opening means 80 to adjust the height of the upper end of the post by inserting pin means 82 into an aligned pair of openings in support 66.

Referring to FIG. 2, when the post is not being used, it is inserted in a short tubular holder 84 welded to the side of forward body section 24.

In use, the distance between channel-shaped supports 32 and 34 is adjusted to accommodate the distance between the skis. The overall length of the frame is adjusted so that the support 66 is rearward of bumper 74 with the skis mounted on supports 32 and 34. When the snowmobile has been raised and supported by a pair of stands 86 and 88 to a position in which track 18 is supported above the ground, the rearward end of the frame is inserted between the skis and beneath the snowmobile. The post is then inserted in a vertical position into support 66.

A connector means such as a chain 87 is connected to the upper end of the post. A hook 90 on the lower end of the chain is inserted in a conventional opening in the rear bumper of the snowmobile. The rear end of the snowmobile track is then suspended several inches above the body of the dolly. Stands 86 and 88 are then removed. The snowmobile can then be maneuvered on the casters to a suitable storage location.

Having described my invention, I claim:

1. A dolly for providing rolling movement on a ground surface for a snowmobile having a rearward track, a pair of forward, elongated, laterally spaced skis, and a rear bumper rearwardly of the track, comprising:

a frame having a forward end and a rear end;

a pair of laterally spaced elongated supports carried on the frame for receiving the laterally spaced skis of a snowmobile in a spaced position above the ground;

forward swivel caster means connected to the forward end of the frame for supporting the elongated supports above a ground surface;

a pair of laterally spaced rear swivel caster means connected to the rear end of the frame so as to be disposed rearwardly of the track of a snowmobile, for supporting same above a ground surface;

the rear end of the frame having a support means with a post-receiving opening disposed midway between the laterally spaced rear swivel caster means;

a post having a lower end receivable in said post receiving opening, and an upper end disposed above the rear bumper on a snowmobile when the track thereof is disposed on the ground surface; and means for connecting the rear bumper of the snowmobile to the post for supporting the rear bumper above the rear swivel caster means.

2. A snowmobile dolly as defined in claim 1, in which the forward end of the frame comprises a pair of channels having parallel slots for receiving bottom ribs on a pair of snowmobile skis.

3. A snowmobile dolly as defined in claim 1, in which the forward end of the frame comprises a pair of laterally spaced supports extending from opposite sides of a frame, and means connecting the laterally-spaced supports such that the distance between a pair of the forward swivel caster means can be adjusted.

4. A snowmobile dolly as defined in claim 1, in which the frame has a pair of telescopically engaged tubular supports connecting the forward end of the frame to said rear end, and means for connecting the telescopically connected tubular supports in an adjusted length whereby the distance between the rear swivel caster means and the forward swivel caster means may be adjusted.

* * * * *